(No Model.)
J. HAWLICZEK.
PROCESS OF MAKING SODIUM BICARBONATE FROM ROASTER ASH.
No. 574,089. Patented Dec. 29, 1896.
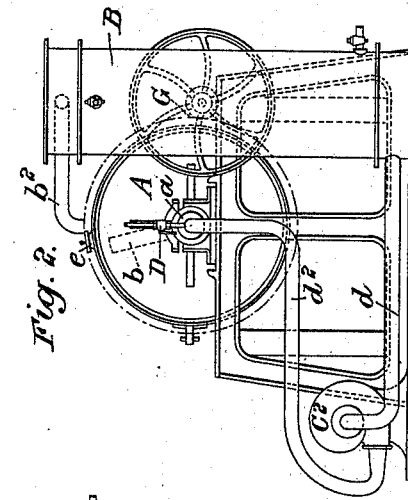
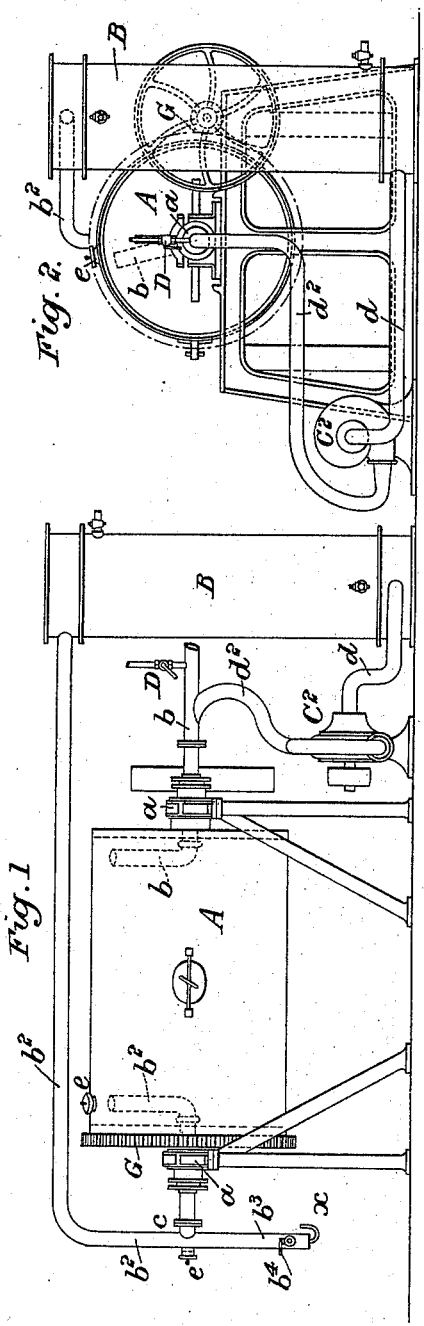
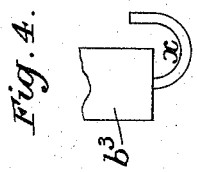
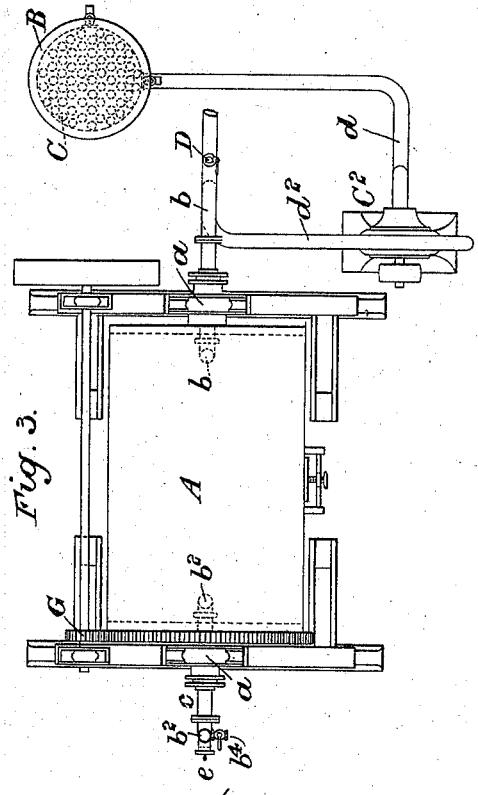
Attest:
Geo Lewis
Wm R. Edelen
Inventor:
Josef Hawliczek
by Pollok & Mauro
his attorneys.

UNITED STATES PATENT OFFICE.

JOSEF HAWLICZEK, OF LIVERPOOL, ENGLAND, ASSIGNOR TO THE UNITED ALKALI COMPANY, LIMITED, OF WIDNES, ENGLAND.

PROCESS OF MAKING SODIUM BICARBONATE FROM ROASTER-ASH.

SPECIFICATION forming part of Letters Patent No. 574,089, dated December 29, 1896.

Application filed August 31, 1895. Serial No. 561,144. (Specimens.)

*To all whom it may concern:*

Be it known that I, JOSEF HAWLICZEK, chemist, a subject of the Emperor of Austria-Hungary, residing at G 11 Exchange Buildings, Liverpool, in the county of Lancaster, England, have invented certain Improvements in the Manufacture of Bicarbonate of Soda, of which the following is a specification.

This invention has for its object to manufacture bicarbonate of soda of a high degree of purity from crude bicarbonate as produced in the ammonia-soda process from which ammonia or salts of ammonia have been eliminated, such as the substance known as "roaster-ash," which is the product obtained by treating in a closed vessel at a temperature not below 130° to 140° centigrade the crude bicarbonate, so as to eliminate therefrom all the ammonia or salts of ammonia. The material resulting from this treatment is similar in composition to sesquicarbonate of soda and contains combined water and considerably more carbonic acid than corresponds to neutral carbonate of soda.

As this roaster-ash or crude bicarbonate so treated does not absorb carbonic acid unless water be first added thereto I add an adequate quantity of water, so that there shall be nine parts by weight of water at least for every fifty-three parts by weight of monocarbonate of soda contained in the ash, the water being either in the liquid form or I may employ it as steam in a closed vessel while continually agitating the mass, as the steam besides hydrating the material assists in its disintegration. When the ash has been sufficiently hydrated, I treat it with carbonic-acid gas in a closed vessel while continuously agitating the mass. Heat is evolved and the ash is gradually and completely converted into bicarbonate of soda. Should there be any excess of water, it can be removed by passing a current of carbonic-acid gas over the warm bicarbonate. The carbonic-acid gas used in these operations may be derived from any source. Carbonic-acid gas obtained during the manufacture of roaster-ash from the crude bicarbonate of soda is very suitable, if every trace of ammonia be removed therefrom by washing; or carbonic acid from a limekiln may be used, if care be taken to remove all traces of sulfurous acid.

I prefer to first hydrate by steam and to subsequently add the carbonic acid in the same vessel, but both operations may be carried on simultaneously in the same vessel by employing a suitable mixture of carbonic-acid gas and steam.

In the drawings forming part of this specification I have illustrated a convenient apparatus whereby my invention may be practiced, and in which—

Figures 1, 2, and 3 are respectively a side elevation, an end view, and a plan view; and Fig. 4 is a detail.

A is an iron cylinder capable of being rotated upon a horizontal axis, consisting of hollow trunnions or axes supported by and capable of turning in bearings $a$, carried by a suitable framework. In this cylinder is placed the crude bicarbonate to be treated.

Passing through the hollow trunnions to the interior of the cylinder A are pipes or tubes $b$ $b^2$, one, $b$, at one end of the cylinder for admitting carbonic-acid gas, and one, $b^2$, at the other end for permitting the exit of gas and when desirable of any superfluous moisture. The portion of these tubes which are inside the cylinder are deflected upward, as shown in Fig. 1, for the purpose of avoiding the lodgment therein of solid material and the consequent stoppage of the free passage of the gas into or from the cylinder.

I find it advisable to have apertures at $e$ $e$ in the cylinder A and exit-pipe $b^2$, respectively, which can be closed air-tight in any convenient manner and through which when necessary the part of the exit-pipe which is inside the cylinder A may be cleaned easily and freed from dust, which is sometimes deposited there.

Outside the cylinder A the exit-pipe $b^2$ is connected at $c$ to the upper end of a tubular condenser B, in which carbonic acid passing from the cylinder A is condensed, the difference of temperature, and consequently the specific gravity between the gas in the upcast part of the pipe $b^2$ and that in the downcast part $b^3$, is such that a circulation of gas can be commenced and maintained when desired through the pipe $b^2$, whereby any moisture which escapes from the bicarbonate during the process, passing away from the cylinder A by the pipe $b^2$, is run off through a lute $x$ in branch $b^3$. Fig. 4 shows a lute $x$ drawn to a larger scale. If at any time this circulation does not commence when desired, I open for a few minutes a tap $b^4$, provided for the purpose at the bottom of the downcast-pipe $b^3$ above the lute. By doing this circulation is at once set up in the pipe $b^2$, and when commenced continues as long as it is required. The cylinder A is provided with openings for inserting and withdrawing the matter to be or having been treated therein, close covers being provided to fit over these openings. Excess of carbonic acid which passes from the cylinder A to the condenser is returned to the cylinder by means of a fan $C^2$, connected to the lower part of the condenser by a pipe $d$ and to supply-pipe $b$ by a pipe $d^2$.

Having described one form of apparatus by which my invention may be performed, I now proceed to describe the method of working which I find to give the best results.

The charge of crude bicarbonate having been introduced, the cylinder A is closed and made to revolve slowly through the intervention of a pulley and spur-gearing G, driven by any suitable motor. I find that from two to six revolutions per minute are sufficient. Carbonic-acid gas is turned on or admitted to cylinder A by the pipe $b$, the temperature of the carbonate of soda rises, and the carbonic-acid gas is rapidly absorbed by the charge. Steam can be admitted to the interior of the cylinder A by a steam-jet D inserted in the supply-pipe $b$. The progress of the operation may be ascertained by withdrawing and testing a sample from time to time. I find, however, that with a regular and sufficient supply of pure or almost pure carbonic acid the operation is so uniform that after a short experience sampling and testing are unnecessary, the state of the carbonating material constituting the charge being inferred with sufficient accuracy by noting the temperature of the cylinder or even only the length of time that the operation has been in progress. When absorption decreases, the temperature falls, and I find in practice that about five or six hours is sufficient to complete the operation, and that at the end of two or three hours, or at the expiration of about one-third of the time necessary to complete the operation, it is advisable to commence drawing off the superabundant moisture. The operation will then proceed satisfactorily, and the resulting bicarbonate will in due time be completely finished and will be found dry and of great purity, and ready, when cold, for immediate grinding and dressing.

What I claim is—

1. The method of manufacturing bicarbonate of soda by converting the sesquicarbonate of soda known as "roaster-ash" into hydrated roaster-ash, and then treating the latter with carbonic-acid gas, as set forth.

2. The manufacture of bicarbonate of soda from crude bicarbonate of soda from which ammonia or salts of ammonia have been eliminated by subjecting the said crude bicarbonate so treated first to the action of steam in a closed vessel and subsequently to the action of carbonic-acid gas while agitating the mass, substantially as hereinbefore described.

In testimony whereof I have signed my name to this specification in the presence of two subscribing witnesses.

JOSEF HAWLICZEK.

Witnesses:
   THOS. WRIGHT,
   WILLIAM RILEY.